United States Patent [19]
Yoshida et al.

[11] Patent Number: 4,820,019
[45] Date of Patent: Apr. 11, 1989

[54] OPTICAL DEVICE

[75] Inventors: Toshihiko Yoshida, Tenri; Haruhisa Takiguchi, Osaka; Shinji Kaneiwa, Nara, all of Japan

[73] Assignee: Sharp Kabushiki Kaisha, Osaka, Japan

[21] Appl. No.: 774,240

[22] Filed: Sep. 9, 1985

[30] Foreign Application Priority Data

Sep. 12, 1984 [JP] Japan .................................. 59-191190

[51] Int. Cl.$^4$ ..................... G02B 27/00; G01B 9/02
[52] U.S. Cl. ..................................... 350/163; 356/345
[58] Field of Search ................ 350/163, 173; 356/345, 356/347

[56] References Cited

U.S. PATENT DOCUMENTS

| | | | |
|---|---|---|---|
| 1,792,766 | 2/1931 | Schröter | 350/163 |
| 2,687,670 | 8/1954 | Locquin | 350/166 |
| 3,695,749 | 10/1972 | Stapleton | 350/163 |
| 4,093,338 | 6/1978 | Bjorklund et al. | 356/345 X |

FOREIGN PATENT DOCUMENTS 444673 12/1924 Fed. Rep. of Germany ...... 350/163

Primary Examiner—John K. Corbin
Assistant Examiner—David J. Edmondson
Attorney, Agent, or Firm—Cohen, Pontani & Lieberman

[57] ABSTRACT

An optical device comprising a transparent plate having planar first reflecting surface and second reflecting surface, a reflector and a screen for forming interference fringes thereon. When a beam is incident on the transparent plate, a portion of the beam is reflected from the first reflecting surface, while the other portion of the beam enters the interior of the plate and is reflected at the second reflecting surface. The beam reflected from the first reflecting surface and further reflected from the reflector and the beam reflected at the second reflecting surface are superposed on the screen to produce interference fringes. The period of the interference fringes is easily variable by rotating the reflector and the screen around the line of their intersection.

2 Claims, 1 Drawing Sheet

FIG. 1
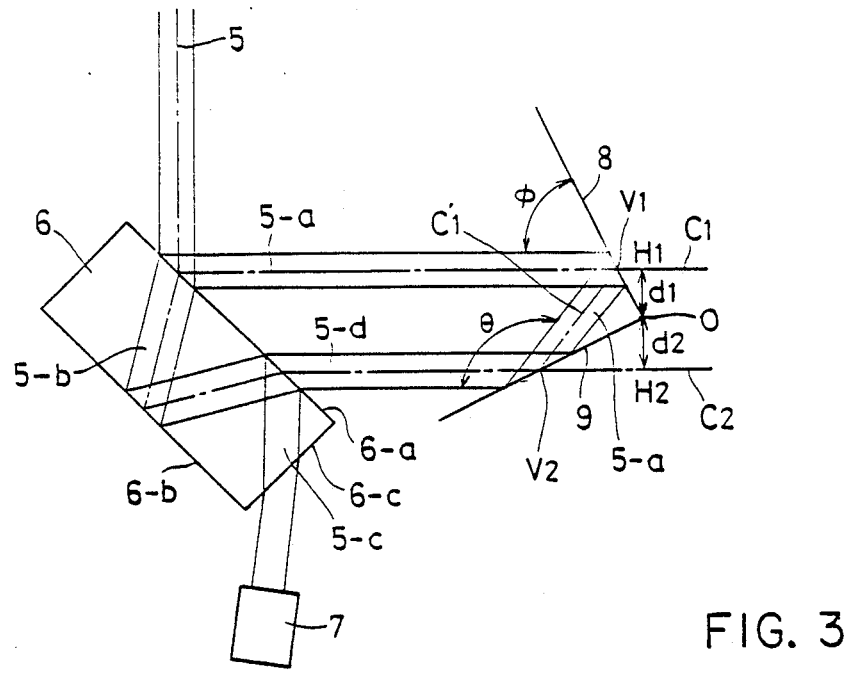
FIG. 2 PRIOR ART
FIG. 3
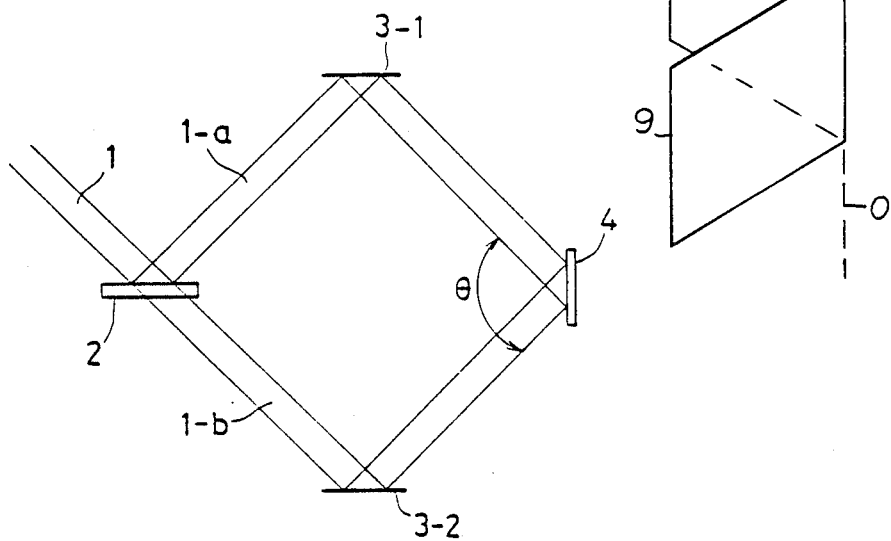

OPTICAL DEVICE

BACKGROUND OF THE INVENTION

1. Field of the Invention

The present invention relates to an optical device which is used for the production of wavelength controlled semiconductor lasers typical of which are distributed feedback lasers and distributed Bragg reflector lasers, and more particularly to an optical device which is useful for forming on the semiconductor substrate of such a laser a diffraction grating acting as a resonator.

2. Description of the Prior Art

Optical devices of this type heretofore proposed include one which employs a two-beam interference system as disclosed, for example, in N. Tsukada et al., "Grating Formation on Gallium Arsenide by One-step Laser-photochemical Etching" (IEE Conf. Publ. (Inst. Electr. Eng.) No. 227, 1983). With reference to FIG. 2 showing the two-beam interference system, a monochromatic coherent laser beam 1 of highly parallel rays, for example, from a He-Cd laser is divided by a beam splitter 2 into two beams 1-$a$ and 1-$b$, which are reflected at mirrors 3-1 and 3-2, respectively, and then made coincident on the surface of a screen 4 again at a predetermined angle to produce on the screen 4 interference fringes in the form of periodic vertical stripes. The period P of the interference fringes is given by:

$$P = \lambda/2 \sin(\theta/2) \quad (1)$$

wherein $\lambda$ is the wavelength of the beam 1, and $\theta$ is the angle between the beams 1-$a$ and 1-$b$ incident on the screen 4. Thus, if the wavelength is constant, the angle $\theta$ between the beam 1-$a$ and the beam 1-$b$ needs to be altered in order to vary the period P of the interference fringes. With the system shown in FIG. 2, however, it is then necessary to adjust the mirrors 3-1 and 3-2, and the screen 4 at the same time. The system therefore has the drawback of making the device complex and large-sized.

SUMMARY OF THE INVENTION

The present invention provides an optical device characterized in that the device comprises a transparent plate having planar first reflecting surface and second reflecting surface for causing a beam incident on the plate at a predetermined angle to emerge therefrom as divided into two beams by reflecting a portion of the incident beam at the first reflecting surface and by reflecting the other portion of the incident beam at the second reflecting surface after allowing the beam portion to pass through the first reflecting surface and the interior of the transparent plate, a mirror for reflecting one of the two divided beams, and a screen for forming thereon interference fringes by superposing said one divided beam reflected from the mirror and the other divided beam incident on the screen from the transparent plate.

Preferably, the mirror and the screen are fixed at a specified angle with each other and are mounted on a rotary support.

Further preferably, the optical device has the following construction. The first and second reflecting surfaces of the transparent plate are arranged substantially in parallel to cause the two beams to emerge from the plate in parallel with each other, while the mirror and the screen are arranged at an angle of 90 degrees therebetween, with the line of intersection of the mirror and the screen in coincidence with the axis of rotation of the rotary support, the line of intersection being at equal distances from the center lines of the two parallel beams.

The main object of the present invention is to provide an optical device which is compact and simple in construction for producing interference fringes having a readily variable period. Thus, the present invention contemplates provision of an optical device which is very useful for fabricating distributed feedback semiconductor lasers and distributed Bragg reflector semiconductor lasers which often involve the necessity of varying the period of interference fringes.

BRIEF DESCRIPTION OF THE DRAWINGS

FIG. 1 is a diagram schematically showing the construction of an embodiment of the present invention; and FIG. 2 is a diagram showing a conventional twobeam interference system for producing interference fringes.

FIG. 3 is an elevated perspective view showing the rotation of the mirror and screen.

DESCRIPTION OF THE PREFERRED EMBODIMENTS

The present invention will be described below in detail with reference to the illustrated embodiment.

Referring to FIG. 1, indicated at 5 is a coherent laser beam of highly parallel rays, e.g., a He-Cd laser beam having a wavelength of 4416 angstroms. A transparent plate 6 of fused quartz has a first reflecting surface 6-$a$ and a second reflecting surface 6-$b$ which are parallel with each other. The laser beam 5 is incident on the first reflecting surface 6-$a$ at a specified angle.

The first reflecting surface 6-$a$ of the transparent plate 6 is provided, for example, with an unillustrated multi-layer dielectric film formed by vacuum evaporation and is given a reflectivity of 38% to divide the single beam 5 into two beams, i.e., a reflected beam 5-$a$ and a refracted beam 5-$b$. On the other hand, the second reflecting surface 6-$b$ of the transparent plate 6 has, for example, an aluminum film formed by vacuum evaporation and is given a reflectivity of 100%. The plate 6 has a side surface 6-$c$ having a multi-layer dielectric film formed by vacuum evaporation and is given a transmittance of 100%. The refracted beam 5-$b$ divided at the first reflecting surface 6-$a$ is totally reflected at the second reflecting surface 6$b$ and then further divided by the first reflecting surface 6-$a$ into a reflected beam 5-$c$ and a refracted beam 5-$d$. Because the first reflecting surface 6-$a$ is parallel with the second reflecting surface 6-$b$, the refracted beam 5-$d$ is parallel with the beam 5-$a$. The reflected beam 5-$c$ passes through the side surface 6-$c$ and impinges on a power meter 7 for monitoring the output of the laser.

A mirror 8 and a screen 9 are fixedly mounted on an unillustrated rotary support. The line of intersection, O, between the mirror 8 and the screen 9 is in coincidence with the axis of rotation of the rotary support, and the distance $d_1$ of the center line $C_1$ of the beam 5-$a$ from the intersection line O is equal to the distance $d_2$ of the center line $C_2$ of the beam 5-$d$ from the line O. Thus, the line of intersection O is positioned at equal distances from the center lines $C_1$ and $C_2$. The angle between the mirror 8 and the screen 9 is 90 degrees. In FIG. 1, the triangle $OV_1H_1$, the triangle $V_2OH_2$ and the triangle $V_2V_1O$ are therefore similar to one another. Accordingly, even if the angle of incidence of the beam 5-a on the mirror 8 is changed to any value by rotating the rotary support, the point of intersection of the center line $C_1'$ of the beam 5-a reflected from the mirror 8 and the center line $C_2$ of the beam 5-d is present on the screen 9.

With the above arrangement, the beam 5 incident on the transparent plate 6 at the specified angle is divided into the two beams 5-a and 5-b by the first reflecting surface 6-a. Thus, the plate 6 serves as a beam splitter. The beam 5-b is totally reflected at the second reflecting surface 6-a and further divided into the two beams 5-d and 5-c by the first reflecting surface 6-a. Because the first reflecting surface 6-a is parallel with the second reflecting surface 6-b, the beam 5-a is parallel with the beam 5-d. The beam 5-a and the beam 5-d are equal in intensity, because the first reflecting surface is set to a reflectivity of 38%. The beam 5-a as reflected from the mirror 8 and the beam 5-d are superposed on the screen 9, forming interference fringes in the form of vertical stripes on the screen 9. The interference fringes have the highest contrast since the beams 5-a and 5-d are equal in intensity.

Assuming that the angle formed between the beam 5-a and the mirror 8 is $\phi$, the angle $\theta$ between the two superposed beams 5-a and 5-d incident on the screen 9 is $2\phi$ because the mirror 8 and the screen 9 are arranged to intersect each other at a right angle at the line O which is at equal distances from the center lines $C_1$ and $C_2$ of the two beams 5-a and 5-d. From Equation (1), therefore, the period $P_0$ is given by:

$$P_0 = \lambda/2 \sin \phi \qquad (2)$$

The relation of Equation (2) remains unchanged when the mirror 8 and the screen 9 are rotated through the same angle by rotating the rotary support. Further the beam 5-a and the beam 5-d incident on the screen 9 are superposed on the screen 9 as already described. Therefore, the period $P_0$ is easily variable according to Equation (2) by rotating the rotary support fixedly carrying the mirror 8 and the screen 9 to alter the angle $\phi$, as illustrated in FIG. 3.

For example, when the laser beam used has a wavelength $\lambda$ of 4416 angstroms and the angle $\phi$ between the beam 5-a and the mirror 8 is 75 degrees, the interference fringes in the form of vertical stripes and produced on the screen 9 have a period $P_0$ of 2286 angstroms as determined from Equation (2).

The present invention is not limited to the foregoing embodiment but can be altered without departing from the scope of the invention. For example, the transparent plate need not be a flat plate having precisely parallel surfaces, while the mirror 8 and the screen 9 need not intersect each other precisely at a right angle. Such relationship can be altered within the scope of the invention insofar as no problem is encountered in actual use.

Because of the foregoing construction, the optical device of the present invention is compact, simple, inexpensive and yet capable of producing interference fringes having a readily variable period.

What is claimed is:

1. An optical device comprising a transparent plate having planar first and second reflecting surfaces for causing a beam incident on the first reflecting surface of the plate at a predetermined angle to be partially reflected as a first divided beam and partially transmitted to the second reflecting surface and reflected therefrom to the first reflecting surface, said reflected beam being partially reflected and partially transmitted by the first reflecting surface, the transmitted portion of said reflected beam being a second divided beam, a mirror for reflecting one of the first and second divided beams and a screen for superimposing the divided beam reflected from the mirror with the other divided beam so as to form interference fringes on the screen, said mirror and screen being relatively fixed in a predetermined angular relationship and being mounted for conjoint rotation so that the predetermined angular relationship of said mirror and screen is maintained as the mirror and screen are rotated.

2. An optical device as defined in claim 1 wherein the first and second reflecting surfaces of the transparent plate are arranged substantially in parallel to cause the two divided beams to emerge from the plate in parallel with each other, the mirror and the screen being arranged at an angle of substantially 90 degrees therebetween, with the line of intersection of the mirror and the screen lying in coincidence with the axis of rotation, the line of intersection being at equal distances from the center lines of the two parallel divided beams.

* * * * *